(No Model.)

H. SEE.
REGULATING PLUG COCK.

No. 505,489. Patented Sept. 26, 1893.

WITNESSES:

INVENTOR
Horace See
BY
ATTORNEY

UNITED STATES PATENT OFFICE.

HORACE SEE, OF NEW YORK, N. Y.

REGULATING PLUG-COCK.

SPECIFICATION forming part of Letters Patent No. 505,489, dated September 26, 1893.

Application filed September 15, 1892. Serial No. 445,955. (No model.)

*To all whom it may concern:*

Be it known that I, HORACE SEE, of the city of New York, in the county and State of New York, have invented a new and useful Regulating Plug-Cock, which invention is fully set forth and illustrated in the following specification and accompanying drawings.

The object of this invention is to provide an efficient multi-way-cock for liquids and fluids.

The invention will first be described in detail and then particularly set forth in the claims.

Figure 1:
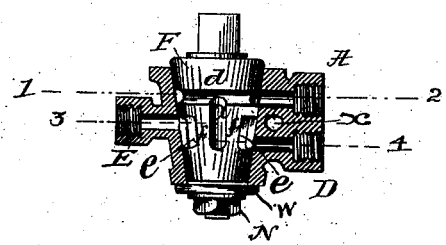
Figure 2:
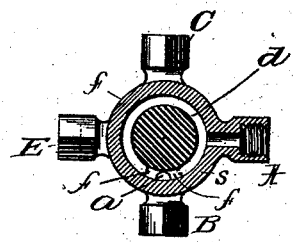
Figure 3:
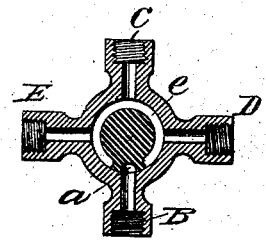

In the accompanying drawings, Figure 1 shows a longitudinal vertical section through the shell of the cock forming the subject of this invention, with the plug inserted therein. Fig. 2 shows a transverse horizontal section through Fig. 1, taken at the line 1, 2. Fig. 3, shows a transverse horizontal section through Fig. 1, taken at the line 3, 4.

In said figures, the several parts are indicated by reference letters as follows:

This cock is particularly adapted to receive water through its nozzle A from a pump and to successively discharge such water through three different lines of pipes to which its respective nozzles B, C and D, may be connected, the act of opening the cock to serve one line of pipe simultaneously discharging either of the pipes previously served by "exhausting" its water through the nozzle E.

The plug F is provided with an annular feed groove $d$ as shown at the line 1, 2, Fig. 1, and by the annular space $d$ in Fig. 2. Said plug is also provided with a wider circumferential exhaust-groove $e$, Figs. 1 and 3, which only partially cuts out the circumference of the plug, leaving an uncut portion $f$, making a water-tight fit with the shell $s$ of the cock. Said portion $f$, is provided with a longitudinal conduit groove $a$, so as to connect at right angles with the annular groove $d$. Between the nozzles A and D, the shell is cored out at $x$ for the sake of diminishing metal (preferably brass) and weight. The plug F is secured in place in the usual manner by a washer $w$ and nut N.

The operation of this cock can now be readily understood and is as follows:—The cock being placed for convenience near a pump, the pump attendant if desiring to supply a pipe leading off from the nozzle B, turns a handle of the plug F, until the groove $a$ in said plug registers with the nozzle B, when the water from the pump flowing in through the nozzle A and passing around the groove $d$ enters the groove $a$, whence it escapes out through the nozzle B. With said plug in this position any water remaining in the pipes connected with the nozzles C and D will pass around the groove $e$ in the plug F and out of the nozzle E, being thus exhausted from the pipes C and D. If it be desired to supply a pipe leading from the nozzle C, the attendant turns the handle of the plug F until the groove $a$ registers with the nozzle C, when the water entering the nozzle A passes around the groove $a$ and out the nozzle C. With the plug in this position any water remaining in the pipes connected to the nozzles B and D will pass around the groove $e$ and out of the nozzle E. If it be desired to supply a pipe leading from the nozzle D, the attendant turns the handle of the plug F until the groove $a$ registers with the nozzle D, when the water entering through the nozzle A passes around the groove $a$ and out the pipe connected with the nozzle D. With the plug F in this position any water remaining in the pipes connected to the nozzles B and C will pass around the groove $e$ and out of the nozzle E.

One use to which this cock is well applicable is as a regulating cock for supplying the ejection-water to hydro-pneumatic ash-ejectors for steamships, as it enables a single attendant at a pump which may be remote from the ejectors to start the same at will. In modern large steamships having several fire-rooms separated from each other into water-tight compartments, it is convenient to have a separate ash-ejector for each fire-room. Where such is the case, one pump fitted with the regulating cock herein described will enable a single attendant to serve all three ash-ejectors from a single standpoint upon pre-concerted signaling in the order in which the operation of either ejector may be required.

It is obvious that more than three discharge nozzles may be served respectively by one and the same entrance nozzle and one and the same exhaust nozzle by making the plug and shell of the cock of suitable diameters and increasing the number of discharge nozzles radiating from the shell, and of course but two discharge nozzles may be used instead of three, if desired.

Having thus fully described my said invention, I claim—

1. A plug-cock consisting of a shell provided with a circumferentially-grooved plug and with one side entrance-nozzle, two or more discharge-nozzles and one side-exhaust-nozzle, whereby said discharge-nozzles are each respectively fed by said entrance-nozzle, and exhausted by said exhaust-nozzle, around the exterior of the plug, substantially as and for the purposes set forth.

2. A plug-cock consisting of a shell, provided with a plug of the form described and having one entrance-nozzle, three discharge-nozzles and one exhaust-nozzle, said exhaust-nozzle and two discharge-nozzles being in the same plane and said entrance-nozzle and one discharge-nozzle being located in planes on either side of said other nozzles, and all of said nozzles radiating from the same shell, substantially as and for the purposes set forth.

3. A plug-cock consisting of the following named parts: a plug provided with an annular feed-groove, as $d$, a longitudinal conduit-groove, as $a$, and a circumferential exhaust-groove, as $e$; and a shell provided with an entrance-nozzle, as A, three discharge-nozzles, as B, C, D, and an exhaust-nozzle, as E; the nozzles B, C, and E being in the same plane and the nozzles A and D being located in planes on either side of said other nozzles; substantially as and for the purposes set forth.

HORACE SEE.

Witnesses:
FRANCIS P. REILEY,
CHAS. P. BARKER.